(12) United States Patent
Berenschot et al.

(10) Patent No.: US 11,259,540 B2
(45) Date of Patent: Mar. 1, 2022

(54) COCOA POWDER COMPOSITIONS

(71) Applicant: CARGILL, INCORPORATED, Wayzata, MN (US)

(72) Inventors: Erik Paul Alosin Berenschot, Zaandijk (NL); Piet Bogart, Nevele (BE)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/780,592

(22) Filed: Feb. 3, 2020

(65) Prior Publication Data

US 2020/0245636 A1 Aug. 6, 2020

Related U.S. Application Data

(62) Division of application No. 14/388,336, filed as application No. PCT/IB2013/000854 on Mar. 26, 2013, now abandoned.

(30) Foreign Application Priority Data

Mar. 27, 2012 (EP) .................................. 12002184

(51) Int. Cl.
| | | |
|---|---|---|
| *A23G 1/32* | (2006.01) | |
| *A23G 1/50* | (2006.01) | |
| *A23G 1/56* | (2006.01) | |
| *A23G 1/40* | (2006.01) | |

(52) U.S. Cl.
CPC .............. *A23G 1/32* (2013.01); *A23G 1/40* (2013.01); *A23G 1/50* (2013.01); *A23G 1/56* (2013.01)

(58) Field of Classification Search
CPC ... A23G 1/32; A23G 1/40; A23G 1/50; A23G 1/56
USPC .......................................................... 426/593
See application file for complete search history.

(56) References Cited

U.S. PATENT DOCUMENTS

| | | | |
|---|---|---|---|
| 1,689,028 A * | 10/1928 | Heyman | ........... A23G 1/56 426/593 |
| 1,802,533 A | 4/1931 | Emmet | |
| 1,849,886 A | 3/1932 | Rosenthal | |
| 1,854,355 A | 4/1932 | Max | |
| 2,336,254 A | 12/1943 | Zenlea et al. | |
| 3,006,763 A * | 10/1961 | Willard | ........... A23G 1/56 426/285 |
| 3,472,658 A | 10/1969 | Isaacs | |
| 3,671,273 A | 6/1972 | Gunter | |
| 4,016,337 A | 4/1977 | Hsu et al. | |
| 4,435,436 A | 3/1984 | Terink | |
| 4,588,604 A | 5/1986 | Baker | |
| 5,041,245 A | 8/1991 | Benado | |
| 5,114,730 A | 5/1992 | Ellis et al. | |
| 6,007,857 A | 12/1999 | Kimura et al. | |
| 6,045,850 A | 4/2000 | Kondou et al. | |
| 6,111,119 A | 8/2000 | Trout | |
| 6,458,402 B1 | 10/2002 | Chang et al. | |
| 6,569,480 B2 | 5/2003 | Hall | |

FOREIGN PATENT DOCUMENTS

| | | |
|---|---|---|
| CN | 1719979 A | 1/2006 |
| DE | 2060211 A1 | 6/1972 |
| DE | 2163796 A1 | 7/1973 |
| EP | 2068641 B1 | 8/2016 |
| JP | 2005341873 A | 12/2005 |

OTHER PUBLICATIONS

"Cacao Cocoa alkalized,butter,chocolate, powder ccbolgrop", http://www.ccbolgroup.com/cacaoE2.html, Feb. 25, 2009, 5 pgs.
"International Search Report of PCT/IB2013/000854, dated Jun. 21, 2013; 3 sheets".
"Kenya standard unsweetened cocoa powder specification", kenya standard unsweetened cocoa powder specification, pp. 17, Apr. 2013 (year: 2013), 2013, 17.
Schmieder , et al., "Characterization and Quantification of Starch in Cocoa Beans and Chocolate Products", Journal of Food Science vol. 45, 1980, 555-563.
Chiu et al., "Modification of Starches," Starch: Chemistry and Technology, 3rd edition, 2009, Chapter 17, pp. 629-655.
Grommers et al., "Potato Starch: Production, Modifications and Uses," Starch: Chemistry and Technology, 3rd edition, 2009, Chapter 11, pp. 511-539.
Dyer, B., "Alkalized Cocoa Powders," 57th PMCA Production Conference, 2003, pp. 128-135.
Maningat et al., "Wheat Starch: Production, Properties, Modification and Uses," Starch: Chemistry and Technology, 3rd edition, 2009, Chapter 10, pp. 441-510.
Mason, W., "Starch Use in Foods," Starch: Chemistry and Technology, 3rd edition, 2009, Chapter 20, pp. 745-795.
Schirmer et al., "Starch gelatinization and its complexity for analysis," Starch, 2015, 67, 30-41.
Minifie Chocolate, Cocoa, and Confectionery 3rd Edition Chapman and Hall 1989 pp. 91, 135 and 136.

* cited by examiner

*Primary Examiner* — Jyoti Chawla

(57) ABSTRACT

A cocoa powder with improved dispersibility.

19 Claims, 3 Drawing Sheets

COCOA POWDER COMPOSITIONS

CROSS-REFERENCE TO RELATED APPLICATIONS

Figure 1:
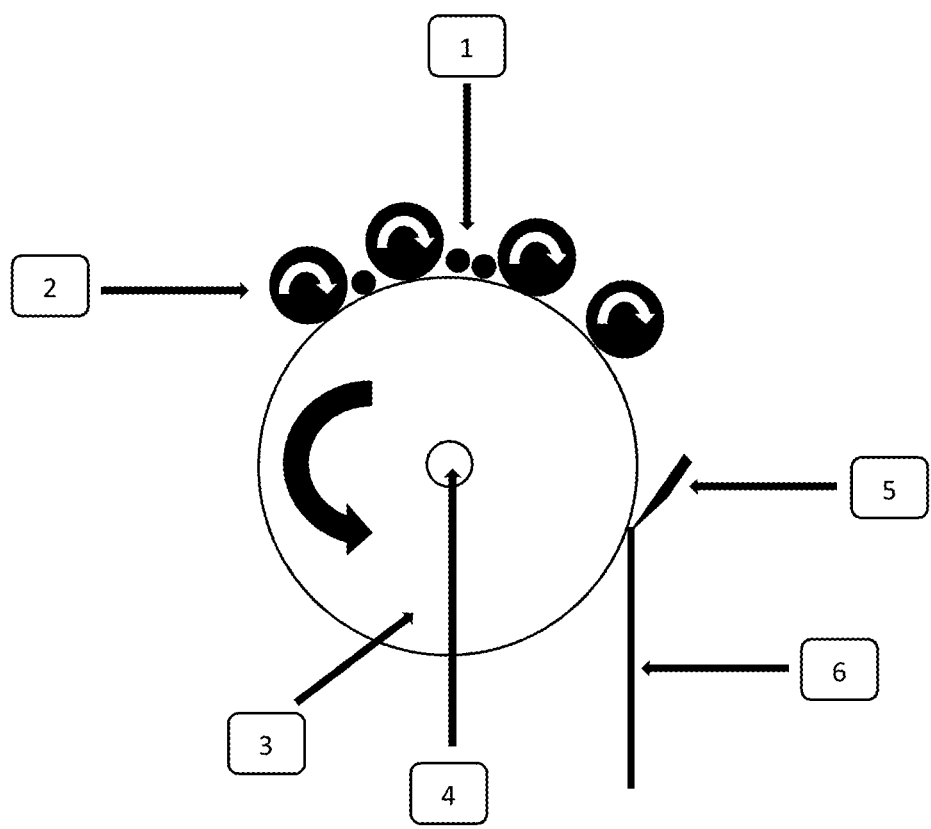

This application is a divisional of U.S. patent application Ser. No. 14/388,336, filed Sep. 26, 2014, entitled COCOA POWDER COMPOSITIONS, which is a national phase application of International Application No. PCT/IB2013/000854, filed Mar. 26, 2013, entitled COCOA POWDER COMPOSITIONS, which claims the benefit of European Patent Application No. 12002184.5, filed Mar. 27, 2012, entitled COCOA POWDER COMPOSITIONS, each of which are hereby incorporated by reference in their entirety.

FIELD OF THE INVENTION

The present invention relates to improved cocoa powder compositions for use in the preparation of beverages and foodstuffs and to methods of making such compositions. In particular, the present invention relates to cocoa powder compositions which have good dispersibility in cold liquids, improved color, taste and smell and a reduced ash content.

BACKGROUND OF THE INVENTION

Cocoa powder, typically containing 10-26% fat, is used in the food industry for a variety of applications, including confectionery, bakery, frozen desserts and beverages. In the beverage industry, it is used to produce compositions for both hot and cold beverages. One of the main problems faced in this respect is the difficulty of obtaining a uniform suspension of cocoa particles in cold liquids. It is indeed desirable that such compositions should wet out and disperse rapidly into cold (e.g. refrigerated) milk or water, producing a beverage which has a smooth texture (mouth-feel), which is uniform in appearance and which is stable for at least several minutes while the beverage is consumed. Unfortunately, when cocoa powder is added to cold liquids a number of undesirable phenomena are observed, including the formation of floating lumps ("floaters") at the liquid's surface due to poor wetting, and excessive sedimentation of cocoa powder aggregates, leading to an overall undesirable sensory experience.

A number of methods have been proposed in the prior art for overcoming these problems. Perhaps the simplest of these methods is to make a paste of cocoa powder with a small amount of liquid to prevent lumping and then to add the rest of the cod liquid with vigorous stirring. Although this method is simple and does not require any additives, it is not practical for the end user (consumer).

Dispersibility can be significantly increased by adding emulsifiers such as lecithin to the cocoa powder. Lecithinated cocoa powders are sold by most major cocoa producers. Unfortunately, they still take more than two minutes to wet out and disperse in cold liquids. Increasing the lecithin level beyond the 5% by weight typically used in such compositions does not improve dispersibility but will lead to stickiness and handling problems which, in turn, can result in the formation of difficult-to-disperse lumps.

U.S. Pat. No. 4,016,337 (Nestle/Hsu) tries to overcome the lumping problem by using silica in conjunction with lecithin and glycerol. A simple grinding process is employed to make a cocoa powder composition that disperses "readily" in cold water. Unfortunately, the test procedure and the time actually required for dispersion are not reported. A laboratory sample made with a similar composition and using a similar process showed very poor cold dispersibility (more than two minutes) when tested with modern dispersibility tests.

Another possibility that has been considered for increasing dispersibility of cocoa powders is the removal or reduction of their fat content. The perception that cocoa butter might be the cause for the failure of cocoa powders to disperse rapidly in cold liquids has motivated considerable prior art directed towards extracting cocoa butter form cocoa powder with appropriate solvents (see, for example, Reid U.S. Pat. No. 1,802,533, Roselius U.S. Pat. No. 4,588,604, Rosenthal U.S. Pat. No. 1,849,886 and, more recently, Benado U.S. Pat. No. 5,041,245, Hall U.S. Pat. No. 6,569,480 and Trout U.S. Pat. No. 6,111,119). Unfortunately, the removal of cocoa butter alone is not sufficient to impart good dispersibility in cold liquids.

Agglomerating cocoa powder with large amounts of sugar (75-85 parts per hundred) has lead to some success but the requirement for such high levels of sugar is considered undesirable, both from a health perspective but also because it effectively dilutes the taste and color of the cocoa powder.

As can be seen from the foregoing discussion, despite many advances over the past decades, there is still an urgent need for a truly "instant" cocoa powder that is capable of being rapidly dispersed in cold milk or water without compromising other properties such as organoleptic properties and shelf life.

SUMMARY OF THE INVENTION

According to a first aspect of the present invention, there is provided a pregelatinized cocoa powder.

According to another aspect of the present invention, there is provided a composition, preferably a cocoa powder composition, comprising the pregelatinized cocoa powder.

According to a further aspect of the present invention, there is provided a food or beverage composition comprising the above cocoa powder or cocoa powder composition.

According to another aspect of the present invention, there is provided a method of improving the dispersibility of a cocoa powder comprising the steps of: mixing a cocoa powder and/or a cocoa cake with a liquid to form a slurry; subjecting the slurry to a pregelatinization step; and recovering a pregelatinized cocoa powder.

FIGURES

Figure 2:
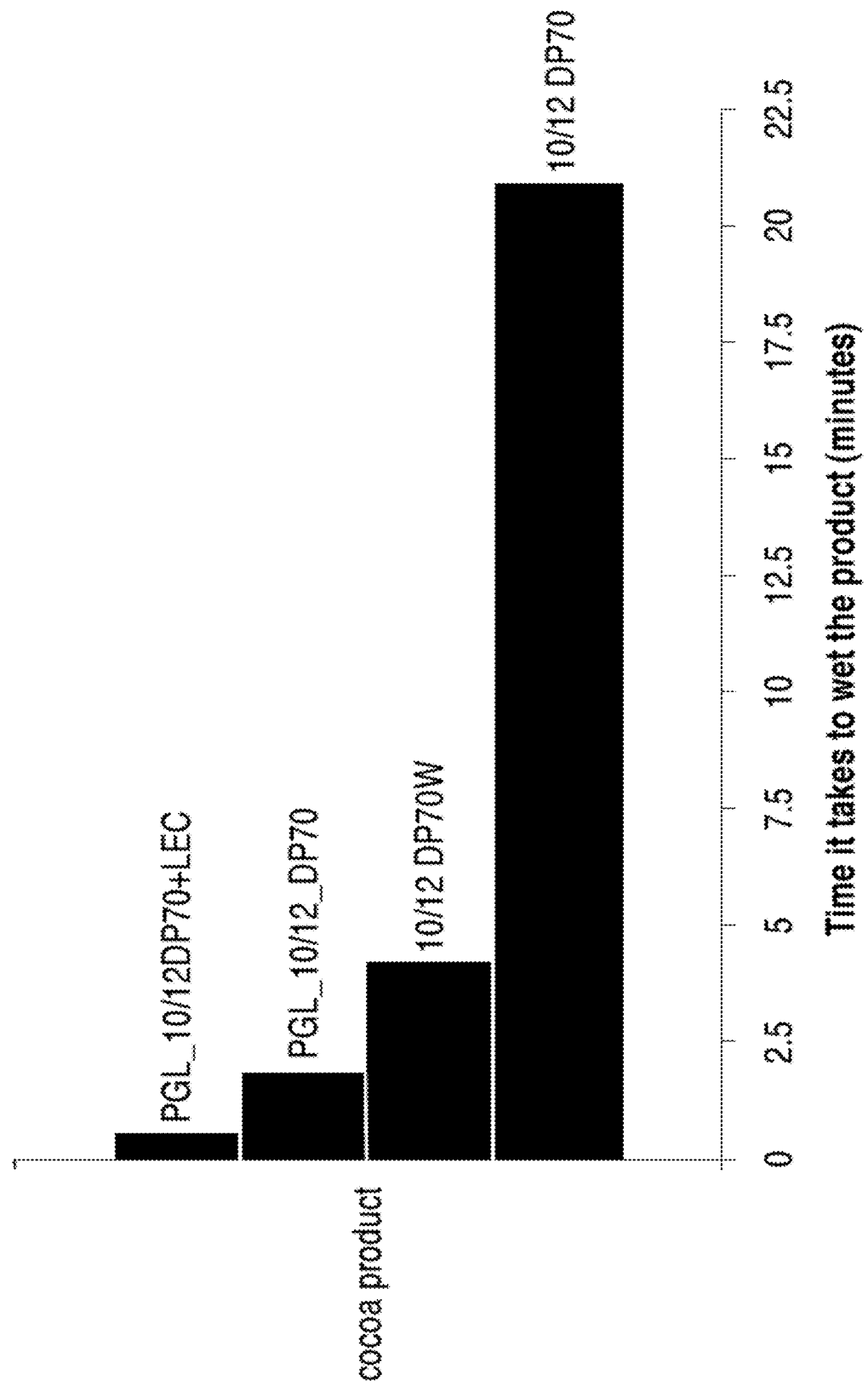
Figure 3:
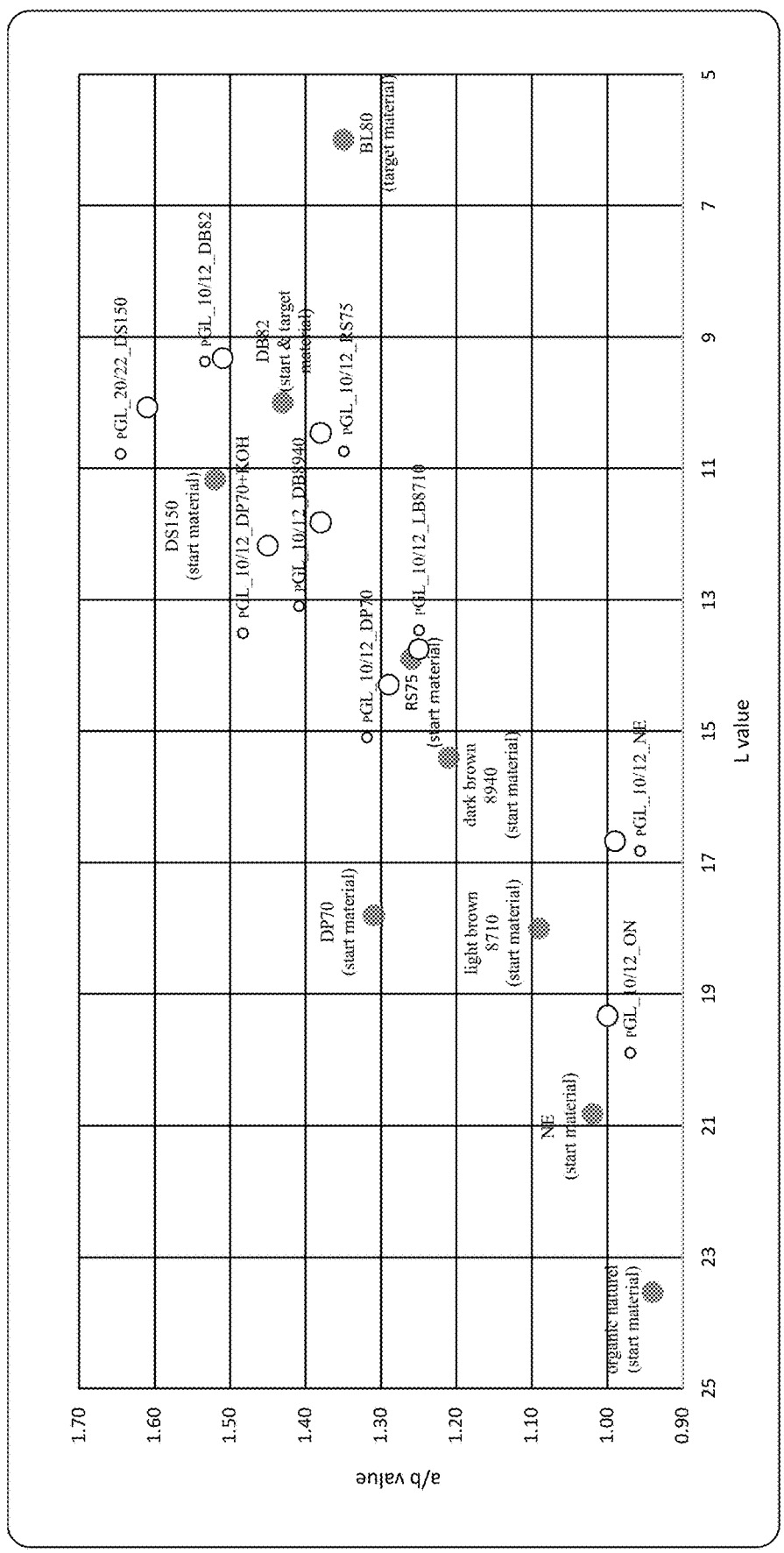

FIG. 1: Schematic representation of cocoa powder pregelatinization on a drum dryer;

FIG. 2: Wettability of various agglomerated cocoa powder products;

FIG. 3: Color profiles of various cocoa powders, including pregelatinized cocoa powders of the invention, plotted as a/b ratio against L value.

DETAILED DESCRIPTION

The present invention relates to cocoa powders which have been subjected to pregelatinization, as defined below (such cocoa powders being referred to herein as "pregelatinized cocoa powders"), and to compositions comprising such pregelatinized cocoa powders.

Pregelatinization is a technique normally used in starch processing to reduce starch hydrophobicity and to increase its cold water solubility. A pregelatinized starch is a starch that has been cooked and then dried, for example, on a drum dryer or in an extruder. Pregelatinized cocoa powder may be made in the same way, or using any other available pregelatinization technique. Preferably, the pregelatinized cocoa powder will be produced by roll-drying a cocoa powder slurry as described in more detail below.

The cocoa powder itself may be from any source and processed (either before or after pregelatinization) according to any methods known in the art (e.g. to improve taste, texture and/or appearance). It may, for instance, be tempered to obtain a tempered cocoa powder, alkalized or dutched to improve color and/or flavor, or milled to obtain a finer or more uniform composition.

The cocoa powder used in accordance with the present invention may be a standard 10-12 cocoa powder (i.e. containing 10 to 12% by weight cocoa butter), a high-fat cocoa powder or a reduced-fat cocoa powder. A reduced-fat cocoa powder is a cocoa powder with a cocoa butter content below 10% by weight. Cocoa butter content can be reduced using any known method. A suitable method is described in WO2004/034801 (Cargill, Incorporated). Once the cocoa butter content is reduced to 5% by weight or less, the cocoa powder will be referred to as a "defatted cocoa powder". Defatted cocoa powders will preferably contain less than 2% cocoa butter by weight. For instance, they may contain 1% cocoa butter or less by weight. Alternatively, they may be substantially fat-free. Advantageously, fat-free cocoa powders will not need to be tempered. A high-fat cocoa powder will contain more than 12% by weight cocoa butter. Typically, it will contain more than 20% by weight cocoa butter. Examples of high-fat cocoa powders include 20/22 and 22/24 cocoa powders containing 20-22% cocoa butter and 22-24% cocoa butter by weight, respectively.

In addition to the pregelatinized cocoa powder, the cocoa powder compositions of the present invention may also comprise one or more additional ingredients.

In particular, the composition may include sugar. The term "sugar" refers to edible crystalline carbohydrates with the general chemical formula $H(HCHO)_nHCO$. Typically, the sugar will be selected from sucrose, fructose, dextrose, maltodextrin, polydextrose and mixtures of two or more thereof. Alternatively, low calorie, calorie free or high intensity sweeteners can be used, if necessary in combination with additional, ideally flavorless, bulking agents. Advantageously, the sugar will be sucrose. It may be used in a (e.g. fine or extra-fine) crystalline form, in a liquid form (e.g. in the form of a syrup or of sugar pre-dissolved in water) or in a powder form. Preferably, a powdered sugar (of the "icing sugar" type) will be used.

The cocoa powder composition will preferably comprise pregelatinized cocoa powder and sugar in a weight ratio of from 1:9 to 9:1, preferably from 2:8 to 8:2. Indeed, although it has traditionally been required to use sugars in amounts of 80% or more by weight, the present invention advantageously allows for less sugar to be used without unduly affecting dispersibility. In fact, it has surprisingly been found that, at lower sugar concentrations, the compositions of the present invention wet considerably faster than equivalent compositions with non-pregelatinized cocoa powder.

While the sugar and pregelatinized cocoa powder may be present in any form (e.g. simple blends or granulates), the composition of the present invention will preferably comprise pregelatinized cocoa powder/sugar agglomerates. Agglomeration is a well-known technique in the industry. In brief, agglomerates are produced by mixing the cocoa powder and sugar, grinding the mixture and then exposing it to steam or water, causing particles of cocoa powder and sugar to adhere.

The cocoa powder composition of the present invention may further include one or more emulsifiers. Although the pregelatinized cocoa powders of the present invention have good dispersibility as such (especially in the case of defatted cocoa powders), emulsifiers may nonetheless be used. They will preferably be used in combination with non-defatted pregelatinized cocoa powders (i.e. with pregelatinized cocoa powders having a cocoa butter content above 5% by weight).

Any available emulsifier can be used (provided, of course, that it is safe for human consumption), but it will be preferred to use a lecithin such as soy or sunflower lecithin. The compositions of the present invention will advantageously include no more than 15% by weight emulsifier, preferably no more than 10% by weight emulsifier. According to certain embodiments, the composition may comprise emulsifier in an amount of between 1 and 8% by weight, preferably between 2 and 7% by weight and, more preferably, between 2.5 and 6% by weight based on total dry weight of the pregelatinized cocoa powder.

Additional optional ingredients may include, by way of example only, stabilizers, bulking agents, coloring agents, flavoring agents, milk solids, vitamins, polyphenols, nutraceuticals and so on. The requirement for and choice of such additional ingredients will be readily determined by a person skilled in the art depending, in particular, on the desired end use of the cocoa powder composition.

It has been found that the pregelatinized cocoa powders of the present invention have significantly improved dispersibility in both warm and cold liquids when compared to equivalent non-pregelatinized cocoa powders. They also have good or improved color profiles, good or improved taste profiles, desirable rheology profiles, improved flowability, and reduced ash content. Similarly, compositions comprising the pregelatinized cocoa powders of the invention have been found to perform as well as or better than equivalent compositions comprising only non-pregelatinized cocoa powders. An "equivalent" cocoa powder or cocoa powder composition is one which is prepared from the same starting materials and which is processed in substantially the same manner or combined with the same additional ingredients, in the same quantities, as the pregelatinized cocoa powder (or pregelatinized cocoa powder composition) of the present invention—save for the fact that the cocoa powder has not been pregelatinized.

Thus, for example, the expressions "improved cold dispersibility" and "improved dispersibility in cold liquids", as used herein, refer to the fact that, under the same conditions, the pregelatinized cocoa powders (or pregelatinized cocoa powder compositions) of the present invention will more readily (or more rapidly) disperse in cold liquids than their equivalent non-pregelatinized cocoa powders (or non-pregelatinized cocoa powder compositions). Cold liquids will be understood to be liquids (such as water or milk) maintained at room temperature or below and, in particular, refrigerated liquids (having a temperature of about 5-7° C.). Dispersibility can be assessed using a number of criteria including: wettability (if and how quickly a composition sinks through the surface of a liquid), lumping (if and how much of the composition remains on the liquid's surface after simple manual stirring) and sedimentation (the rate at which the composition sinks to the bottom of the liquid after stirring).

Advantageously, the pregelatinized cocoa powders and cocoa powder compositions of the present invention will have an average wettability time (referred to herein simply as "wettability" and measured according to Method 1), of 120 seconds or less, preferably of 90 seconds or less, more preferably of 60 seconds or less, more preferably of 30 seconds or less. Advantageously, they may have a wettability of less than 20 seconds, more preferably of less than 10 seconds.

Surprisingly, in one particular embodiment, a composition consisting of defatted, pregelatinized cocoa powder agglomerated with powdered sugar in a weight ratio of 8:2, has been found to have a wettability time in cold liquids of less than 30 seconds. A corresponding non-pregelatinized composition would simply not wet at all, even after an hour in the liquid.

When added to a cold liquid, the pregelatinized powders and compositions of the present invention will preferably be characterized by a substantial absence of lumping and a very slow rate of sedimentation (preferably, only a very small amount of powder/composition—e.g. less than 10% by weight—will sink to the bottom of the liquid 10 seconds after stirring).

As a result, the pregelatinized cocoa powders and cocoa powder compositions of the present invention are particularly suitable for use, for example, in the preparation of cold chocolate milk drinks and other food and/or beverage compositions, the preparation or production of which benefits from or is facilitated by the satisfactory dispersion of a powder in a non-heated liquid. Examples of such products may include, without limitation, chocolate milk and other milk-based drinks, flavored yogurt drinks, milkshakes, sauces, infant formulas, creams, icings, mousses, whipped or "instant" desserts, mousses, custards, and liquid cake or batter pre-mixes.

The powders and compositions of the invention may also be used in the preparation of hot beverages and foodstuffs such as hot chocolate drinks, sauces or bakery products. Indeed, they have unexpectedly been found to also have improved dispersibility characteristics even in hot liquids.

In fact, the products of the present invention may be used like any other cocoa powders or cocoa powder compositions, in any number of food and beverage applications. They have indeed been found to have a number of benefits other than their easy dispersibility. In particular, the pregelatinized cocoa powders and cocoa powder compositions of the present invention have been found to have improved color compared to their non-pregelatinized equivalents.

Cocoa powder color can be defined in terms of L, a and b values, together with the a/b ratio. These values can be determined on a color measurement spectrophotometer (such as the Hunterlab Colorquest with Illuminant C and 2° standard observer—calibrated with black and white tiles). The L value is a value for the darkness of the mass (black/white scale); the a value is a value for the amount of green/red in the sample; and the b value is a value for the amount of yellow/blue in the sample. An a/b ratio can be calculated to reflect the redness of the cocoa powder sample.

"Improved color" refers to the fact that the pregelatinized powders/compositions will preferably have a lower L value than their non-pregelatinized equivalents. Preferably, they will have an L value which is at least 1 point lower, more preferably at least 2 points lower, more preferably at least 3 points lower, resulting in a darker cocoa powder or cocoa powder composition. They may also have a lower a value. Preferably, they will have an a value which is at least 0.5 points lower, more preferably at least 1 point lower, more preferably at least 2 points lower, resulting in a browner color. They may also have a lower b value. Preferably, they will have a b value which is at least 0.5 points lower, more preferably at least 1 point lower, more preferably at least 2 points lower, resulting in a less yellow powder/composition. Advantageously, they will have an a/b value which is close to that of equivalent, non-pregelatinized powders/compositions (i.e. preferably within 1 point, more preferably within 0.5 points), resulting a similar reddish color.

Thus, pregelatinized cocoa powders of the invention may contribute, in terms of color, to a more varied cocoa powder portfolio. In other words, color profiles which have previously been difficult to achieve may now be available through the use of pregelatinized cocoa powders of the invention. In particular, the present invention preferably provides a pregelatinized cocoa powder with:

an L value of less than 20, preferably less than 17, more preferably less than 15, more preferably less than 13, more preferably less than 11; and/or an a value of less than 10, preferably less than 9, more preferably less than 8, more preferably less than 7, more preferably less than 6; and/or a b value of less than 10, preferably less than 8, more preferably, less than 6, more preferably less than 4; and/or an a/b value of 0.90 to 1.75, preferably of 0.95 to 1.5, more preferably of 1 to 1.4.

Because the pregelatinized cocoa powders and compositions of the present invention have a darker color than their non-pregelatinized equivalents, the need for alkali treatment is reduced or indeed eliminated Alkali treatment of cocoa powders has traditionally been used to help a desirable dark color to develop. Unfortunately, it can also lead to undesirable off-tastes and to increased ash content. Thus, the pregelatinized cocoa powders/compositions of the present invention will preferably have a lower ash content than alkalized, non-pregelatinized cocoa powders/compositions of equivalent darkness. More preferably, they will have an ash content:

below 12% by weight on total dry matter, more preferably below 11%, more preferably below 10%; and/or below 14% by weight on fat-free dry matter, more preferably below 13%, more preferably below 12%.

The pregelatinized cocoa powders and compositions of the present invention will also preferably have a desirable nutty/roast, sweet/caramel like flavor. Advantageously, they will not have any (or will have reduced) off-flavors associated with acidic or unfermented notes in the flavor profile.

Furthermore, unlike their non-pregelatinized equivalents, the pregelatinized cocoa powders and cocoa powder compositions of the present invention will advantageously be capable of imparting a desirable increase in viscosity when used, for example, in the manufacture of a chocolate milk type beverage. They have also been found to have better flowability and reduced dustiness compared their non-pregelatinized equivalents.

Methods of producing the above cocoa powders and cocoa powder compositions are also part of the present invention. In particular, the present invention provides a method of improving the dispersibility of a cocoa powder—together with the cocoa powders obtainable thereby—comprising the steps of:

mixing a cocoa powder and/or a cocoa cake with a liquid to form a slurry;

subjecting the slurry to a pregelatinization step; and recovering a pregelatinized cocoa powder.

A "cocoa cake" is an unprocessed form of cocoa powder. By way of background information, cocoa nibs are ground to produce a cocoa liquor which is then pressed to extract cocoa butter, leaving a cocoa cake. The cake is then typically milled and sieved to produce cocoa powder. In the method of the present invention, cocoa cake can be used directly as the starting material. Alternatively, the starting material can be cocoa powder or a mix of cocoa powder and cocoa cake.

Both the cocoa powder and cocoa cake can be of any origin and of any type (e.g. standard 10-12, high fat or reduced fat)—as described above. They may also be treated (either before or after pregelatinization) using any known means (e.g. alkalization, tempering, milling/grinding, etc). Of course, the starting material may be a single cocoa powder or cocoa cake or it may be a mixture of two or more cocoa powders and/or cakes.

The cocoa powder/cake is mixed with a liquid, preferably water, to form a slurry. Mixing can be performed using any known means, for example in a mechanical mixer (e.g. with a paddle, disc or blade mixer) or in a high shear mixer. The slurry may further comprise one or more additional ingredients. For example, it may comprise an alkali such as sodium hydroxide or potassium hydroxide. If an alkali is used, it will preferably be potassium hydroxide. The amount of alkali to be used can be determined by a skilled person based on standard procedure in the art. Advantageously, however, lower amounts of alkali can be used to achieve similar levels of darkness in the resulting powder, compared to non-pregelatinized equivalents.

The slurry will preferably have a dry substance, by weight, of 20-35%. Ideally, it will have a dry substance of more than 20%, e.g. of 22% or more or of 25% or more. Indeed, with a dry substance of less than 20%, the slurry may become difficult to dry and therefore more expensive. With a dry substance much above 35%, the slurry may become viscous and difficult to handle. According to a particular aspect of the present invention, the slurry's dry substance will be in the range of 25-30% by weight, for example approximately 27% by weight.

The slurry is subjected to a pregelatinization step. As described above, pregelatinization involves cooking and then drying the cocoa powder under certain conditions. After cooking and drying, the pregelatinized cocoa powder will preferably have a moisture content of less than 4% by weight, more preferably of less than 1.5%.

A number of pregelatinization techniques are known in the art and any of them can be used as part of the present invention. For example, pregelatinization can be achieved with a drum- or roll-dryer, an extruder, a spray-cooking or spray-drying installation or with super-heated steam. Preferably however, the pregelatinization step will comprise roll-drying. Advantageously, cooking and drying of the cocoa powder slurry will be achieved at a temperature in the range of 100-250° C., more preferably of 120-200° C., more preferably of 150-180° C. (wherein the stated temperature is the environmental temperature on or within the cooking/drying equipment, rather than the product temperature as such—for example, it might be the temperature of the steam in a drum dryer).

According to one particular embodiment, the slurry will be delivered onto a roll-dryer (e.g. of the type manufactured by Gouda), passed through applicator rolls, heated and dried by means of steam e.g. at 150-180° C., and then recovered. A non-limiting illustration of this process is shown in FIG. 1, in which: (1) represents the slurry supply, (2) represents the applicator rolls, (3) represents the big roll, (4) represents steam, (5) represents the knife or blade, and (6) represents a dried film of pregelatinized cocoa powder. As will be apparent to a person skilled in the art, a number of roll-dryer parameters can be adjusted depending on the slurry's initial dry substance and the desired product outcome. These include rolling speed, temperature, distance between the big roll and the applicator rolls, knife position, inlet steam pressure, and feeding flow. A skilled person will know how to adapt these parameters to obtain the desired pregelatinized cocoa powder of the present invention. Preferably, however, both the distance between the big roll and the applicator rolls and the distance between the knife and the big roll will be no more than 2 mm; and the rotation speed of the drum will be 3/36-6/36 (or 5-10 rpm), preferably 4/36-5/36 (or 7-8.5 rpm).

After pregelatinization, the cocoa powder may be used as such or it may be mixed with one or more additional ingredients—as described above. Preferably, the method of the present invention will include the step of mixing the pregelatinized cocoa powder with sugar. This may be achieved, for example, by simple mechanical mixing (e.g. with a paddle, disc, pin or knife mixer), by granulation, homogenization (e.g. in a high-shear mixer or via a fluidized bed), agglomeration or any other mixing or blending methods known to those skilled in the art. Preferably, the pregelatinized cocoa powder and sugar will be agglomerated.

Agglomeration will typically consist of blending the pregelatinized cocoa powder and sugar to a desired ratio (as defined above), then milling the mixture and exposing it to steam or water. Due to the contact with steam/water, the sugar will partly dissolve causing cocoa powder to adhere to it. The technique and its various embodiments and permutations are well known in the industry.

Milling (or grinding) can be achieved using any means known in the art, preferably under standard cocoa processing parameters. Ideally, the milling step will be used to achieve a pre-determined particle size. It may be used as part of an agglomeration step or, separately, as part of the method of the present invention. For example, when using cocoa cake as a starting material, it may be desirable to include a milling step before the pregelatinization step, to reduce the cocoa particle size before further processing. Preferably, a milling step will be included after pregelatinization but before agglomeration (if used).

The method of the present invention may also include a sieving step. Although this may be performed at any stage, it will preferably be carried out after milling (when used). If such a step is included, the sieve will preferably be a 0.1 to 2.0 mm sieve, more preferably a 0.1-1.5 mm sieve, more preferably a 0.1-1.0 mm sieve. For example, 0.5 mm sieve may be suitable.

As noted above, the cocoa powder composition of the present invention may also comprise one or more emulsifiers. As such, the above method may also include the step of adding one or more emulsifiers. Emulsifiers, if used, will preferably be added to the composition after the pregelatinization step. If the method includes an agglomeration step, any emulsifiers will preferably be mixed to the cocoa powder prior to agglomeration.

Other steps that may be included in the method of the present invention will be apparent to a person skilled in the art. For example, it may include one or more tempering steps and/or the addition of one or more further optional ingredients as defined above (e.g. flavoring agents). When used, these further optional ingredients will preferably be added to the composition after the agglomeration step.

Various embodiments of the present invention will now be described in more detail in the following, non-limiting examples.

EXAMPLES

Methodology

Method 1—Wettability 150 ml of a cold milk (7° C.) is poured into a 250 ml beaker (9 cm high/7 cm wide). 15 g of a selected cocoa powder or cocoa powder composition are placed in a 150 ml beaker and then gently poured onto the surface of the milk using a funnel (5 cm high, top opening: 8 cm wide, bottom opening: 2.5 cm wide). The time it takes for the powder to completely sink below the liquid's surface is recorded as the wettability time and graded as listed in Table 1

TABLE 1

WETTABILITY

| Grade | Time required for complete wetting |
|---|---|
| Very good | 0-30 seconds |
| Good | 31-60 seconds |
| Moderate | 61-120 seconds |
| Weak | 121-180 seconds |
| Poor | More than 180 seconds |

To obtain the average wettability time for a sample, the above measurement is repeated at least three times and the average wettability is then calculate as $[(T_1+T_2+\ldots+T_n)/n]$.

Method 2—Lumping and Sedimentation

After determining wettability time (or after 3 minutes, whichever is shorter), the liquid is manually stirred with a teaspoon, 5 times clockwise and 5 times anti-clockwise. The liquid is then left to settle for 10 seconds and the quantity of powder still on the surface—also referred to as "floaters" or lumping—is estimated visually (in relation to the total amount of powder added). Finally, the beakers are placed on a mirror stand to determine how much powder has settled onto the bottom ("sedimentation"). Lumping and sedimentation are graded according to the criteria of Tables 2 and 3, respectively.

TABLE 2

Lumping (L)

| Grade | Description |
|---|---|
| 91-100% | All or nearly all powder remaining on the surface |
| 51-90% | More than half of the powder remaining on the surface |
| 21-50% | Substantial amount of powder remaining on the surface |
| 1-20% | Small to moderate amount of powder remaining on the surface |
| Less than 1% | No powder remaining on the surface |

TABLE 3

Sedimentation (S)

| Grade | Description |
|---|---|
| 91-100% | All or nearly all product at the bottom |
| 51-90% | More than half of the product at the bottom |
| 21-50% | Substantial amount of product at the bottom |
| 1-20% | Small to moderate amount of product at the bottom |
| Less than 1% | No product on the bottom |

Example 1—Preparation of Pregelatinized Cocoa Powder

Cocoa powder slurries, having a dry substance (ds) of 20%, 24%, 25%, 27% and 29.5% respectively, were prepared by mixing defatted cocoa powder (Submarine cocoa powder, Cargill) with water using a Typhoon Mixer. Mixing was performed at 20-25° C. and 3000 rpm for 30 minutes (note: in a separate experiment—not illustrated here, the water was heated to 60° C. before mixing. This also gave good results). The obtained slurries were then continuously pumped, under agitation, onto a Gouda drum-dryer (Type E515). The conditions on the roll-dryer are set out in Table 4. The knife position was set at 1.35 mm and the applicator rolls were positioned as follows: roll 1 (front knife): 1.35 mm, roll 2: 0.95 mm—feed point—roll 3: 0.85 mm, and roll 4 (back side): 1.25 mm.

TABLE 4

Preparation of Pregelatinized Cocoa Powder

| Batch | Cocoa Powder (kg) | Water (kg) | Dry Substance (%) | Inlet Steam Pressure (bar) | Feeding Flow (l/h) | Rolling Speed (rpm) |
|---|---|---|---|---|---|---|
| 1 | 14.3 | 45 | 24.1 | 8.5-9.5 | 42 | 4/36 |
| 2 | 15 | 45 | 25 | 9.5-10 | 42 | 4/36 |
| 3 | 16.2 | 43.8 | 27 | 9.6 | 41 | 4/36 |
| 3' | 16.2 | 43.8 | 27 | 9.6 | 41 | 5/36 |
| 4 | 18 | 43 | 29.5 | 9 | 41 | 4/36 |
| 4' | 18 | 43 | 29.5 | 9 | 41 | 5/36 |
| 5 | 12 | 48 | 20 | 11 | 24 | 4/36 |

Example 2—Color Determination

The pregelatinized cocoa powders prepared in Example 1 were analyzed using a color measurement spectrophotometer (Hunterlab Colorquest with Illuminant C and 2° standard observer—calibrated with black and white tiles) to determine Hunter "L", "a" and "b" values. The "L" value is a value for the darkness of the mass (black/white scale); the "a" value is a value for the amount of green/red in the sample; and the "b" value is a value for the amount of yellow/blue in the sample. An "a/b" quotient can be calculated to reflect the redness of the cocoa powder sample. Samples were prepared by adding 5 g of cocoa powder to 15 ml of tap water (at 50-60° C.) in a 100 ml glass beaker and stirring with a stirring rod until a homogeneous slurry is formed. The slurry is then allowed to cool to room temperature for 15 minutes. The slurry is then stirred again and decanted into an optically neutral petri dish (Sterilin) for measurement. The results are shown in Table 5.

TABLE 5

Color Determination

| Batch | L | a | b | a/b |
|---|---|---|---|---|
| 1 | 11.73 | 6.56 | 4.61 | 1.42 |
| 2 | 12.31 | 6.98 | 5.47 | 1.34 |
| 3 | 11.88 | 6.98 | 5.20 | 1.28 |
| 4 | 12.23 | 7.09 | 5.52 | 1.28 |
| 5 | 11.71 | 6.93 | 5.23 | 1.33 |
| Reference* | 16.41 | 9.17 | 6.93 | 1.21 |

*Raw material defatted GHL from Cargill, Incorporated (non-pregelatinized)

Example 3—Agglomeration

Cocoa powder batches, prepared according to Example 1, were agglomerated with icing sugar. Two batches of each were prepared, one with a sugar to cocoa powder weight ratio of 80:20 and one with a sugar to cocoa powder weight ratio of 20:80. The cocoa powder was mixed with the required amount of sucrose to form samples of at least 200 g. The mix was then ground in a Retsch mill (type ZM1100—Haan, Germany) equipped with a Retsch 0.5 mm sieve. Agglomerates were made by slowly pouring (using a vibrating gutter set to 70% speed) the ground mix over a stream of steam (produced by boiling 150 ml of water at 110° C. in a bath with an attached extended spout provided with a hose). The formed agglomerates were then caught in a bowl and sieved with a 1 mm sieve and a 0.5 mm sieve. Reference samples were also produced according to this method, using the same defatted cocoa powder but without pregelatinization. Agglomerate size distribution is indicated in Table 6.

TABLE 6

Agglomerate Particle Size Distribution

| Sample | Size Distribution (% by weight) | | |
|---|---|---|---|
| | <0.5 mm | 0.5-1 mm | >1 mm |
| Batch 1 (80:20) | 8.9 | 35.7 | 55.4 |
| Batch 2 (80:20) | 7.8 | 34.2 | 58.0 |
| Batch 3 (80:20) | 9.6 | 34.7 | 55.6 |
| Batch 3' (80:20) | 8.3 | 34.8 | 57.0 |
| Batch 4 (80:20) | 8.6 | 34.3 | 57.1 |
| Batch 4' (80:20) | 8.2 | 35.2 | 56.6 |
| Batch 5 (80:20) | 7.9 | 36.0 | 56.0 |
| Reference (80:20) | 17.6 | 42.6 | 39.8 |
| Batch 1 (20:80) | 2.7 | 49.9 | 47.4 |
| Batch 2 (20:80) | 2.3 | 51.6 | 46.1 |
| Batch 3 (20:80) | 2.4 | 55.5 | 42.1 |
| Batch 3' (20:80) | 2.4 | 54.6 | 42.9 |
| Batch 4 (20:80) | 2.4 | 55.3 | 42.3 |
| Batch 4' (20:80) | 2.6 | 51.7 | 45.6 |
| Batch 5 (20:80) | 3.1 | 50.3 | 46.6 |
| Reference (20:80) | 92.2 | 7.8 | 0.0 |

* 80:20 refers to agglomerates of 80% sugar and 20% cocoa powder; 20:80 refers to agglomerates of 20% sugar and 80% cocoa powder.

Agglomerates with a particle size between 0.5 and 1 mm were retained for dispersibility testing.

Example 4—Dispersibility

The retained agglomerate samples were assessed for dispersibility in cold milk (using Methods 1 and 2, above). The results are shown in Table 7.

TABLE 7

Cold Dispersibility Assessment

| Sample | Dispersibility Performance | | |
|---|---|---|---|
| | Average wetting time (s) [+/−std deviation] | Floaters (%) | Sedimentations (%) |
| Batch 1 (80:20) | 5.0 [0.0] | 0 | 21-50 |
| Batch 2 (80:20) | 5.7 [0.6] | 0 | 21-50 |
| Batch 3 (80:20) | 6.0 [0.0] | 0 | 21-50 |
| Batch 3' (80:20) | 6.0 [0.0] | 0 | 21-50 |
| Batch 4 (80:20) | 5.0 [0.0] | 0 | 21-50 |
| Batch 4' (80:20) | 5.7 [0.6] | 0 | 21-50 |
| Batch 5 (80:20) | 6.0 [0.6] | 0 | 21-50 |
| Reference (80:20) | 9.3 [0.6] | 0 | 0 |
| Batch 1 (20:80) | 27.3 [0.6] | 0 | 0 |
| Batch 2 (20:80) | 26.7 [0.6] | 0 | 0 |
| Batch 3 (20:80) | 22.7 [0.6] | 0 | 0 |
| Batch 3' (20:80) | 22.7 [0.6] | 0 | 0 |
| Batch 4 (20:80) | 27.3 [0.6] | 0 | 0 |
| Batch 4' (20:80) | 25.3 [0.6] | 0 | 0 |
| Batch 5 (20:80) | 26.0 [0.0] | 0 | 0 |
| Reference (20:80) | 4015.0 [72.1] | 0 | 0 |

As can be seen from these results, at 80% sugar, the compositions of the present invention perform comparably (if not in fact better in terms of wettability) than their non-pregelatinized counterparts. With a significantly reduced sugar content (20%), the compositions of the present invention perform markedly better than their non-pregelatinized counterparts, with an average wetting time below 30 seconds.

Example 5—Preparation of Pregelatinized Cocoa Powder

Cocoa powder was weighed out and mixed with water at 70° C. to 27% dry solids by weight, using a mixer (Typhoon type 10/20 mixer) and a 65 litre plastic drum. The obtained slurry was then transferred to a feeding tank, where it was continuously pumped, under agitation, onto a drum dyer (type E 5/5 drum dryer from GMF-Gouda b.v.). The drum dryer was set up with an inlet steam pressure of 9.5-10 bar and a rolling speed of 4/36 (7 rpm). The knife position was set at 1.35 mm and the applicator rolls were positioned as follows: roll 1 (front knife): 1.35 mm, roll 2: 0.95 mm—feed point—roll 3: 0.85 mm, and roll 4 (back side): 1.25 mm. The feeding flow was set at 42 I/h. The temperature of the steam was set at 180° C.

The following samples were prepared:

TABLE 8

| Sample no. | Prepared from (cocoa powders used as starting materials*) | Pregelatinized material | Target material (cocoa powders used for comparison*) |
|---|---|---|---|
| 1 | 10/12 Organic Natural | PGL_10/12_ON | |
| 2 | 10/12 NE | PGL_10/12_NE | |
| 3 | 10/12 DP70 | PGL_10/12_DP70 | 10/12 GT78 (alkalized) |
| 4 | 10/12 DP70 | PGL_10/12_DP70 + KOH | 10/12 GT78 (alkalized) |
| 5 | 10/12 RS75 | PGL_10/12_RS75 | 10/12 DB82 |
| 6 | 10/12 DB82 | PGL_10/12_DB82 | 10/12 BL80 |
| 7 | 20/22 DS150 | PGL_20/22_DS150 | 10/12 BL80 |
| 8 | 10/12 Light Brown 8710 | PGL_10/12_LB8710 | 350 DP-11 (from ADM) |
| 9 | 10/12 Dark Brown 8940 | PGL_10/12_DB8940 | 350 DP-11 (from ADM) |

*all available from Cargill, Incorporated, unless otherwise specified.

All starting cocoa powders were 10/12 cocoa powders (i.e. having 10-12% fat content by weight), except for sample 7 which was prepared from a 20/22 cocoa powder. All cocoa powders were slurried with only water, except for sample 5 which was prepared from a slurry of cocoa powder and water+an alkali (KOH)—see Example 11 for details.

The products obtained from the roll dryer were in the form of flakes with open pores. These were ground with a Retsch mill (type ZM200) to obtain a powder.

Example 6—Evaluation of Wettability Properties

The pre-gelatinized cocoa powder of Sample 3 (PGL_10/12_DP70) was agglomerated with icing sugar in a weight ratio of 20 parts cocoa powder to 80 parts sugar. The wettability properties of the agglomerated samples were then compared with those of agglomerated non-pregelatinized 10/12 DP70 cocoa powder ("reference agglomerates").

Agglomeration 160 g icing sugar (Suiker Unie: 2245) and 40 g pregelatinized cocoa powder were placed in a Stomacher bag and mixed. The mix was then ground in a Retsch mill (type ZM100—Haan, Germany) equipped with a Retsch 0.5 mm sieve. Agglomerates were made by slowly pouring (using a vibrating gutter set to 70% speed) the ground mix over a stream of steam (produced by boiling 150 ml of water at 110° C. in a bath with an attached extended spout provided with a hose). The formed agglomerates were then caught in a bowl and sieved with a 1 mm sieve and a 0.5 mm sieve. The same method was also used to produce the reference agglomerates.

Wettability

The wettability of the different agglomerates was evaluated using Method 1, above, modified only in that the milk was at room temperature (22° C.), instead of 7° C. All measurements were performed in triplicate. The results are shown in Table 9 and FIG. 2.

Sedimentation

After completion of the wettability test, sedimentation was determined using Method 2, above. No significant difference in sedimentation was observed between the pre-gelatinized cocoa powder agglomerates and the reference cocoa powder agglomerates.

Floaters

Floaters (or "lumping") was determined using Method 2, above. No floaters were observed with the pre-gelatinized cocoa powders agglomerates. For the reference agglomerates, 1-20% floaters were observed.

Example 7—Lecitination

Both the pre-gelatinized cocoa powder of Sample 3 (PGL_10/12_DP70) and the non-pregelatinized 10/12 DP70 cocoa powder were lecithinated. First, all ingredients were warmed in a stove at 60° C. 462.5 g cocoa powder were then weighed into a Kitchen Aid bowl and placed in a bain marie set at 75° C. 12.5 g of water was poured onto the cocoa powder and mixed for 5 minutes with the S-arm at speed setting 1. The mixer is then stopped. A dimple is formed in the cocoa powder and 25 g of soybean lecithin (Ruchithin RF Solutions) is poured in. Mixing is then re-started at speed setting 1 for 30 minutes. The lecithin-coated cocoa powder is then removed from the bain marie and immediately milled in a Retsch mill using a 0.5 mm sieve.

The lecithinated powders were then agglomerated in accordance with the method of Example 6, above (in a ratio of 20 parts lecithinated cocoa powder and 80 parts icing sugar). The wettability properties of the resulting powders were then compared. The results are shown in Table 9 and FIG. 2 (where "10-12 DP70w" refers to lecithinated, non-pregelatinized 10/12 DP70 agglomerates.

TABLE 9

| Samples (agglomerated) | Wettability (in minutes) | | | | Floaters (%) | Sedimentations (%) |
| --- | --- | --- | --- | --- | --- | --- |
|  | I | II | III | average |  |  |
| PGL_10/12_DP70 | 2.0 | 1.9 | 1.8 | 1.9 | 0 | 1-20 |
| 10/12 DP70 | 21.0 | 20.9 | 21.1 | 21.0 | 1-20 | 1-20 |
| PGL_10/12_DP70 + LEC | 0.5 | 0.5 | 0.5 | 0.5 | 0 | <10 |
| 10/12 DP70w | 4.5 | 4.4 | 4.5 | 4.5 | 0 | 1-20 |

The pre-gelatinized cocoa powder based agglomerates wetted more rapidly (within 2 minutes) and showed fewer, if any, floaters after stirring than the corresponding reference agglomerates. After lecithination, the pre-gelatinized agglomerates showed a major improvement in terms of wettability performance (to 30 seconds or less), with no floaters and less 10% sedimentation after stirring.

Example 8—Color

The effect of pregelatinization on color was determined using a color measurement spectrophotometer (Hunterlab Colorquest with Illuminant C and 2° standard observer calibrated with black and white tiles) to determine Hunter "L", "a" and "b" values. The "L" value is a value for the darkness of the mass (black/white scale); the "a" value is a value for the amount of green/red in the sample; and the "b" value is a value for the amount of yellow/blue in the sample. An "a/b" quotient can be calculated to reflect the redness of the cocoa powder sample.

Samples were prepared by adding 5 g of a cocoa powder sample to 15 ml of tap water (at 50-60° C.) in a 100 ml glass beaker and stirring with a stirring rod until a homogeneous slurry is formed. The slurry is then allowed to cool to room temperature for 15 minutes. The slurry is then stirred again and decanted into an optically neutral petri dish (Sterilin) for measurement. The results are shown in Table 10 and FIG. 3.

TABLE 10

| | Colour properties | | | |
| --- | --- | --- | --- | --- |
| Sample | L | a | b | a/b |
| PGL_10/12_ON | 19.33 | 8.02 | 8.04 | 1.00 |
| 10/12 Organic Natural | 23.53 | 9.65 | 10.25 | 0.94 |
| PGL_10/12_NE | 16.67 | 7.01 | 7.10 | 0.99 |
| 10/12 NE | 20.82 | 9.61 | 9.40 | 1.02 |
| PGL_10/12_DP70 | 14.3 | 7.4 | 5.7 | 1.29 |
| PGL_10/12_DP70 + KOH | 12.2 | 6.8 | 4.7 | 1.45 |
| 10/12 DP70 | 17.8 | 10.5 | 8.0 | 1.31 |
| 10/12 GT78 | 13.1 | 8.7 | 5.7 | 1.53 |
| PGL_10/12_RS75 | 10.46 | 5.46 | 4.11 | 1.38 |
| 10/12 RS75 | 13.90 | 7.70 | 6.10 | 1.26 |
| 10/12 DB82 | 10.00 | 5.30 | 3.70 | 1.43 |
| PGL_10/12_DB82 | 9.32 | 4.25 | 2.81 | 1.51 |
| PGL_20/22_DS150 | 10.07 | 4.89 | 3.04 | 1.61 |
| 10/12 BL80 | 5.20 | 1.30 | 0.90 | 1.35 |
| PGL_10/12_LB8710 | 13.75 | 7.07 | 5.66 | 1.25 |
| Light Brown 8710 | 18.00 | 8.90 | 8.20 | 1.09 |
| PGL_10/12_DB8940 | 11.82 | 6.05 | 4.38 | 1.38 |
| Dark Brown 8940 | 15.40 | 8.00 | 6.70 | 1.21 |
| 350 DP-11 (from ADM) | 13.00 | 6.90 | 5.60 | 1.24 |

By way of example, the pre-gelatinized RS75 can be compared with the 10/12 RS75 start material, as described below:

the L value of the pre-gelatinized cocoa powder was much lower than the equivalent non-pregelatinized powder. The pre-gelatinized cocoa powder was thus much darker (L=13,9→11,8±0,3).

The a value of the pre-gelatinized cocoa powder was lower than the equivalent non-pregelatinized powder. The pre-gelatinized cocoa powder thus had a more brownish color (a=8,6→6,3±0,5).

The b value of the pre-gelatinized cocoa powder was lower than the equivalent non-pregelatinized powder. The pre-gelatinized cocoa powder was less yellow (b=6,3→4,4±0,3).

The a/b ratio of the pre-gelatinized cocoa powder did not change significantly compared to the equivalent non-pregelatinized powder. The pre-gelatinized cocoa powder thus had the same reddish appearance (a/b=1,37→1,41±0,05).

Example 9—Sensorial Properties

The organoleptic properties of the pre-gelatinized cocoa powders were evaluated by experienced taste experts and compared to both their non-pregelatinized equivalents and, in some instances, to cocoa powder with similar colour properties (for instance, the pre-gelatinized RS75 has similar colour properties to DB82). The results are presented in Table 11, below.

TABLE 11

| Sample | Flavor |
| --- | --- |
| PGL__10/12__NE | Less acidic - sweet/caramel - mild cocoa |
| 10/12 NE | Slightly acidic (off taste) - light cocoa |
| PGL__10/12__DP70 | nutty - slightly sweet/caramel - mild cocoa |
| PGL__10/12__DP70 + KOH | nutty - slightly sweet/caramel - mild cocoa |
| 10/12 DP70 | Mild alkaline - fruity - stronger cocoa |
| 10/12 GT78 | Strong alkaline - stronger cocoa - rancid aftertaste |
| PGL__10/12__RS75 | Dark roast/nutty - slightly sweet/caramel - light alkaline - mild cocoa |
| 10/12 RS75 | Fruity - lightly alkaline - slightly bitter - stranger cocoa |
| 10/12 DB82 | Strong alkaline - bitter - salty - stronger cocoa |
| PGL__10/12__LB8710 | Roast/nutty - sweeter/caramel - mild cocoa |
| Light Brown 8710 | Fruity - lightly alkaline - slightly bitter |
| PGL__10/12__DB8940 | No alkaline taste - sweet/caramel - mild cocoa |
| Dark Brown 8940 | Light alkaline taste - bitter |
| 350 DP-11 (from ADM) | Strong alkaline - stronger cocoa |

Example 10—Ash Content

The ash content of pre-gelatinized cocoa powders, as well as their non-pregelatinized equivalents and, in some instances, cocoa powder with similar colour properties, was determined both on total dry matter and on fat free dry matter, according to standard analytical method ICA-24 (of the International Cocoa Association). The results are set out in table 12, below.

TABLE 12

| | Ash content (%) | | | |
| --- | --- | --- | --- | --- |
| Sample | Fat (%) | Moisture (%) | Dry matter | Fat free dry matter |
| PGL__10/12__NE | 10.4 | 3.0 | 6.2 | 6.9 |
| 10/12 NE | 10.3 | 3.1 | 6.3 | 7.0 |
| PGL__10/12__DP70 | 10.7 | 2.6 | 9.3 | 10.4 |
| PGL__10/12__DP70 + KOH | 10.6 | 1.6 | 10.1 | 11.3 |
| 10/12 DP70 | 10.5 | 3.6 | 9.4 | 10.6 |
| 10/12 GT78 | 10.7 | 3.9 | 10.8 | 12.2 |
| PGL__10/12__RS75 | 10.4 | 3.7 | 10.5 | 11.8 |
| 10/12 RS75 | 10.5 | 3.5 | 10.5 | 12.1 |
| 10/12 DB82 | 10.1 | 2.5 | 13.3 | 14.9 |
| PGL__10/12__LB8710 | 13.8 | 4.0 | 9.6 | 11.1 |
| Light Brown 8710 | 14.2 | 4.3 | 9.5 | 11.2 |
| PGL__10/12__DB8940 | 10.5 | 4.0 | 10.8 | 12.2 |
| Dark Brown 8940 | 10.5 | 5.2 | 11.0 | 12.3 |
| 350 DP-11 (from ADM) | 10.6 | 3.9 | 12.6 | 14.1 |

Example 11 Alkalization During Pre-Gelatinization Process 100 ml of a 50% aqueous KOH solution were added to the DP70 cocoa powder-water mixture, which was prepared with 9 kg of cocoa to achieve 27% dry solids. The aim of this test was to produce a sodium-free equivalent of the alkalized cocoa powder GT78.

The alkali content of the different products was calculated and compared (see table 13). For example, the alkali content of 100 g of DP70 was calculated as follows:

$$\frac{\text{weight } K_2CO_3 (g)}{\text{molecular weight } K_2CO_2 \left(\frac{g}{mol}\right)} =$$

$$\text{number of moles of } K_2CO_3 (mol) \rightarrow \frac{2.11}{138} = 0.0153 \text{ mol}$$

Where:
Weight $K_2CO_3$=2.11 g
Molecular weight $K_2CO_3$=138 g/mol
Molecular weight NaOH=40 g/mol
Molecular weight KOH=56 g/mol

TABLE 13

| Sample (100 g) | $K_2CO_3$ 50% sol. (moles) | NaOH 33% sol. (moles) | KOH 50% sol. (moles) | Total alkali content (moles) |
| --- | --- | --- | --- | --- |
| PGL__10/12__DP70 | 0.0153 | — | — | 0.0153 |
| PGL__10/12__DP70 + KOH | 0.0153 | — | 0.00998 | 0.0253 |
| 10/12 DP70 | 0.0153 | — | — | 0.0153 |
| 10/12 GT78 | 0.0114 | 0.0228 | — | 0.0342 |

The above examples of the compositions of the present invention and methods for preparing them is not intended to be exhaustive or limiting but are merely included for illustrative purposes. Various equivalent modifications are possible within the scope of the invention, as those skilled in the art will recognize. The teachings of the present invention are applicable to other powder compositions. They may not be limited to the compositions and methods described above.

The invention claimed is:

1. A method of making a pregelatinized cocoa powder product, comprising: (1) making a slurry with 20-35% by weight dry substances, the slurry comprising cocoa powder and water, wherein more water is in the slurry than cocoa powder, and (2) cooking and drying the slurry at a temperature in the range of 100-250° C. to produce the pregelatinized cocoa powder product; wherein the pregelatinized cocoa powder product has an ash content of less than 12% by weight on dry matter and less than 14% by weight on fat-free dry matter.

2. The method according to claim 1, wherein the pregelatinized cocoa powder product has an average wettability time, in cold liquids, of 120 seconds or less.

3. The method according to claim 1, wherein the pregelatinized cocoa powder product has an L value of less than 20.

4. The method according to claim 1, further comprising adding sugar to the pregelatinized cocoa powder product after cooking and drying.

5. The method according to claim 4, further comprising agglomerating the pregelatinized cocoa powder product and the sugar.

6. The method according to claim 4, wherein the pregelatinized cocoa powder and sugar are present in a weight ratio of 1:9 to 9:1.

7. The method according to claim 4, wherein the pregelatinized cocoa powder and sugar are present in a weight ratio of 2:8 to 8:2.

8. The method according to claim 4, wherein the pregelatinized cocoa powder and sugar are present in a weight ratio of about 8:2.

9. A food or beverage composition comprising the pregelatinized cocoa powder product of claim 1.

10. The method of claim 1, wherein the cooking and drying is carried out using a drum-dryer, a roll-dryer, spray-cooking, spray-drying, or super-heated steam.

11. The method of claim 1, wherein step (2) comprises drum-drying or roll-drying the slurry at a temperature in the range of 100-250° C. to produce the pregelatinized cocoa powder product.

12. The method of claim 1, wherein the slurry is cooked and dried at a temperature between 120-200° C.

13. The method of claim 1, wherein the slurry is cooked and dried at a temperature between 150-180° C.

14. The method of claim 1, wherein the slurry is cooked and dried to a moisture content of less than 4%.

15. The method of claim 1, wherein the slurry is cooked and dried to a moisture content of less than 1.5%.

16. The method of claim 1, wherein the pregelatinized starch has an a/b ratio of 0.90 to 1.75.

17. The method of claim 1, wherein the pregelatinized cocoa powder product has an L value less than 15.

18. The method of claim 1, wherein the pregelatinized cocoa powder product has an L value less than 15 without an alkali treatment.

19. The method of claim 1, wherein the L value of the pregelatinized cocoa powder product is less than the L value of the cocoa powder used to prepare the slurry.

* * * * *